United States Patent [19]

Marulli

[11] 4,018,427
[45] Apr. 19, 1977

[54] ELECTROPLATING BARREL SIDEWALL CONSTRUCTION

[75] Inventor: Alfred N. Marulli, Bristol, Conn.

[73] Assignee: National Plastics & Plating Supply Co., Inc., Terryville, Conn.

[22] Filed: Jan. 23, 1975

[21] Appl. No.: 543,641

[52] U.S. Cl. .............................. 259/81 R; 204/213
[51] Int. Cl.² .................... C25D 17/22; B01F 9/00
[58] Field of Search ............. 259/81 R, 89, 90, 30, 259/14, 3; 204/213; 264/2 SS

[56] References Cited
UNITED STATES PATENTS

| | | | |
|---|---|---|---|
| 3,394,071 | 7/1968 | Gill | 204/213 |
| 3,953,633 | 4/1976 | Noonan | 204/213 |

Primary Examiner—Billy S. Taylor
Attorney, Agent, or Firm—McCormick, Paulding & Huber

[57] ABSTRACT

An electroplating barrel of polygon shape has interlocked panels, and each panel has an outer grid portion defining relatively large rectangular openings, and an integrally formed inner portion including a perforated plate contiguous with the outer grid portion. A method is disclosed for forming the panel from polypropylene with a substantial portion of chopped glass fibers both the inner and outer panel portions being integrally formed with one another in an injection molding machine.

4 Claims, 5 Drawing Figures

ELECTROPLATING BARREL SIDEWALL CONSTRUCTION

SUMMARY OF THE INVENTION

This invention relates generally to electroplating barrels, and deals more particularly with a barrel of polygon shape with its sidewll constructed from integrally molded individual panels which can be readily assembled with one another as a result of mating male and female side edges. The panels are provided with outwardly projecting longitudinally extending ribs which serve to agitate the electrolite and enhance the flow of the electrolite through the sidewall of the barrel. Each panel also includes a generally flat inside surface characterized by relatively shallow breaker bars integrally formed at the inside edges of the longitudinally extending ribs. A perforated thin plate, formed from the same material as the inner breaker bars and outer grid defining rib structure, is provided integrally between these and serves to hold even the smallest articles inside the barrel without any tendency for snagging the corners of the articles being electroplated. The combined open grid and perforated plate portions of each of the panels is formed in a split mold, which mold is preferably shimmed to accommodate the thickness of the perforated plate. The plate is preformed and placed in the mold so that it is integrally welded to the injection molded grid portion and the breaker bar defining portion of the panel.

A general object of the present invention is to provide an inexpensive barrel sidewall construction characterized by a plurality of individual panels each of which is capable of being formed in an injection molding machine, and each of which has side edges which mate with an adjacent panel thereby eliminating the need for axially extending support members in the barrel framework.

Another object of the present invention is to provide an inexpensive electroplating barrel sidewall construction wherein the various panels cooperate to present a relatively smooth inside surface to the articles being plated, which inside surface has axially or longitudinally extending breaker bars integrally formed therein to cause the articles to tumble as the barrel rotates. This inside surface is also perforated but the perforated portion is relatively thin so as not to interfere with the free flow of the electrolite through such perforations.

Still another object of the present invention is to provide a panel of the foregoing character, which panel includes an outer grid structure serving to support the relatively thin perforated plate, and which panel also has axially or longitudinally extending ribs which serve to agitate the electrolite and thereby further improve the circulation of the electrolite fluid both into and out of the barrel.

DETAILED DESCRIPTION

Figure 4:
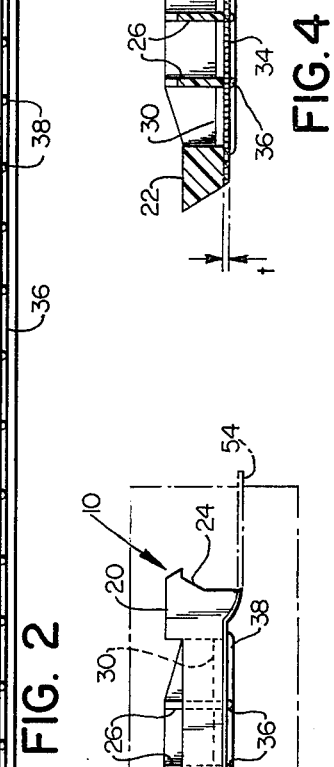
FIG. 4 is a sectional view taken generally on the line 4—4 of FIG. 1.
Figure 5:
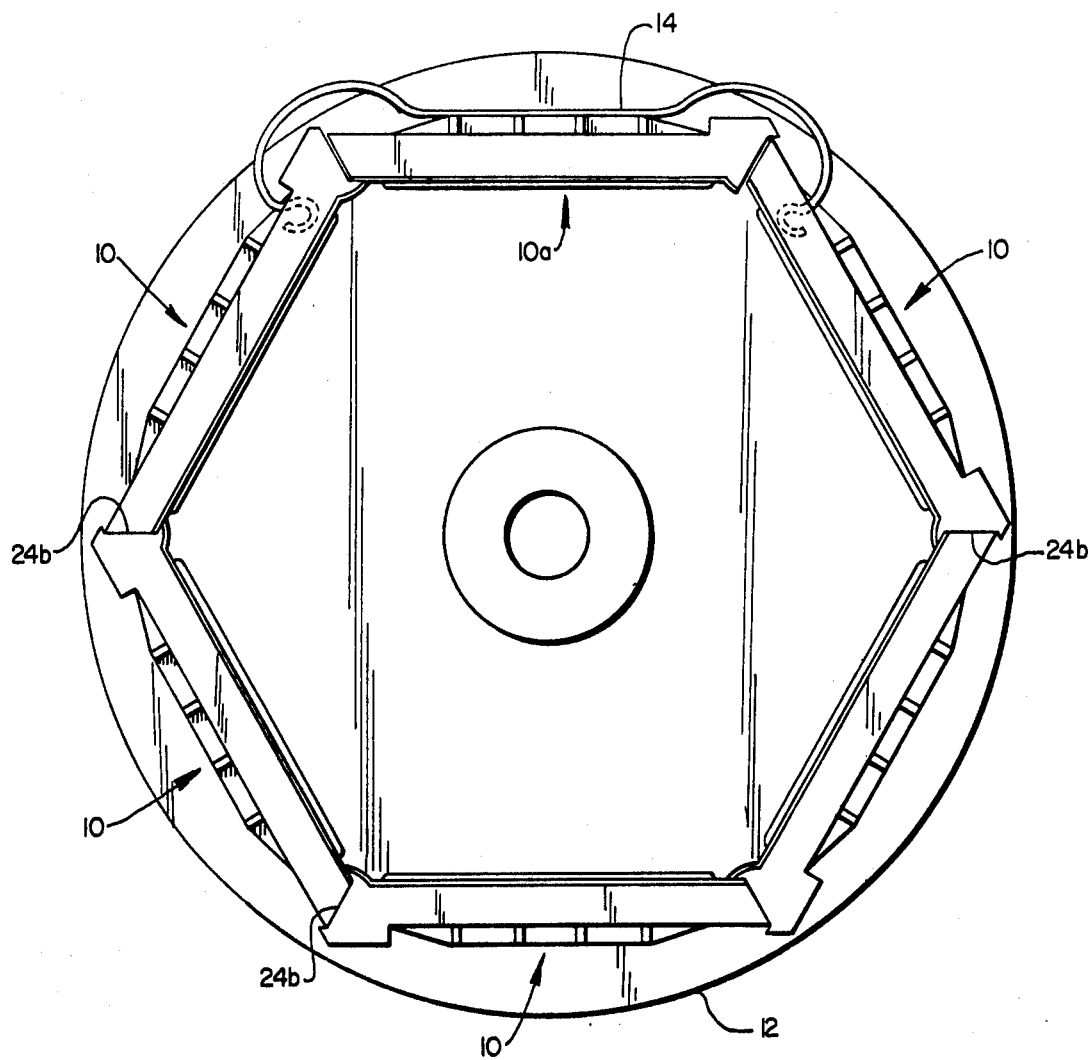
FIG. 5 is an end view of the assembled electroplating barrel with one end plate removed so as to better reveal the cooperating male and female side edges of the various panels used to assemble a barrel of the present invention.

FIG. 5 shows a barrel constructed in accordance with the present invention, such a barrel having a generally hexagonal shape being defined by a plurality of panels 10, 10 arranged in an axially symmetrical fashion and mounted to an end plate 12. One of these panels 10a is not directly mounted to the end plate 12 but is instead adapted to being held in place by one or more spring clips 14. While one end plate is shown, the nearer end plate (not shown) has been eliminated in order to better reveal the mating connection between the adjacent side edges of the various panels 10, 10 comprising the sidewalls of the electroplating barrel. Conventional barrel supporting and rotating structure together with means for providing an electrode in the interior of the barrel is not shown or described in this application because of the fact that such construction may comprise any conventional arrangement as shown, for example, in my prior U.S. Pat. No. 3,340,170 issued Sept. 5, 1967. Since the present invention relates more particularly to the method and means for fabricating the panels 10, 10 illustrated in FIG. 5 the remaining portion of this specification will be devoted to a detailed description of FIGS. 1–4 inclusively.

Figure 1:
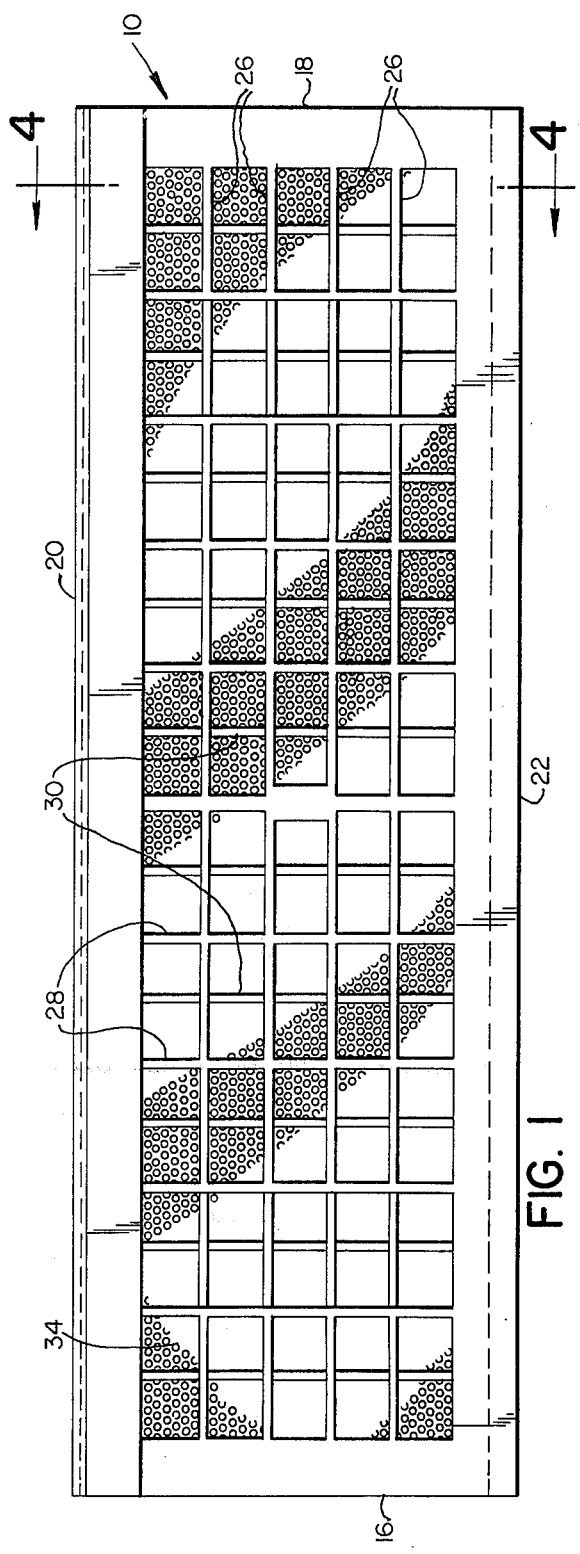
FIG. 1 is a plan view showing the outside surface of a single panel construction in accordance with the present invention and adapted for use in assemblying a barrel sidewall construction incorporating the present invention.
Figure 3:
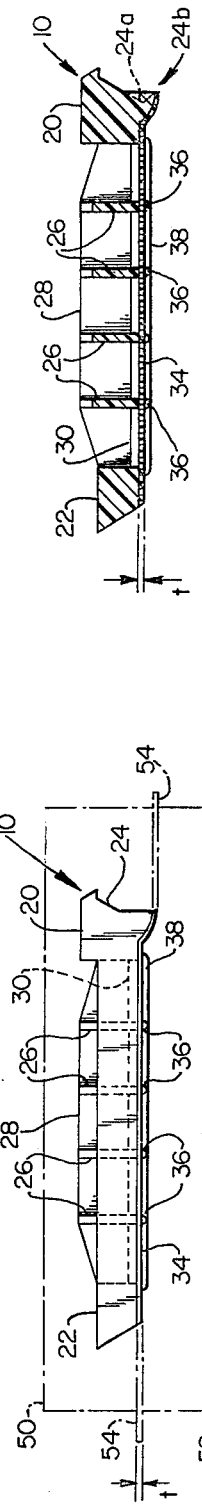
FIG. 3 is an end view of the panel illustrated in FIGS. 1 and 2 but also illustrates in phantom lines the configuration of a preferred mold construction of the type use to practice the method of the present invention.

FIG. 1 shows a single panel 10 as seen from the exterior of the barrel of FIG. 5. The panel 10 comprises a rectangular structure having its shorter sides, 16 and 18, adapted to being assembled with one or the other of the end plates mentioned previously with reference to the FIG. 5 barrel. The longer sides, 20 and 22, of the generally rectangular panel 10 are joined at their respective ends to the shorter sides 16 and 18 with the thicker of the longer two sides, side 20, being formed with a cross sectional shape best illustrated in FIGS. 3 and 4. This thicker side 20 comprises the female side edge of the panel and after a minor machining step is adapted to being assembled with the opposite longer side 22 in order to form the sidewall of the barrel as illustrated in FIG. 5. More particularly, the relatively thicker side 20 is provided with a longitudinally extending notch 24 best shown in FIG. 3 with the result that removal by a machining operation of the generally triangular section, best illustrated in FIG. 4 at 24a provides a generally rectanguar notch 24b as best shown in FIG. 3, which notch 24b defines the female portion or mating edge for each of the panels 10, 10 of FIG. 5. The somewhat thinner, opposite, longer side 22 of the panel 10 is generally trapezoidal in cross sectional shape and adapted to being received in this notch 24b as best shown in FIG. 5.

The panel 10 includes an outer portion which defines a generally grid-like structure with relatively large rectangular openings being defined by longitudinally extending ribs 26, 26 and shorter cross ribs 28, 28. Relatively shallow cross ribs 30, 30 are also provided between the ribs 28, 28. It will be apparent that this outer portion of the generally rectangular grid structure can be conveniently formed in a plastic injection molding machine, and that the technology required for so forming the integral rectangular grid structure defined by the ribs 28, 30 and 26 as well as the relatively heavier side portions 16, 18, 20 and 22 does exist. The reference line 32 of FIG. 2 illustrates the inner surface of the outer grid portion described hereinabove, and in accordance with the present invention the description to follow relates particularly to the inner or remaining portion of the rectangular panel 10 as well as the manner in which this inner grid portion is formed, that is, integrally with such outer rectangular grid portion.

Figure 2:
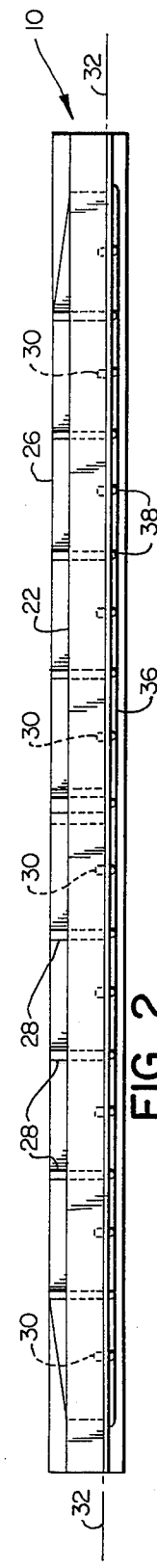
FIG. 2 is a side elevational view of the panel illustrated in FIG. 1.

The inner portion of the generally rectangular panel 10, that is the portion defined radially inwardly of the line 32 of FIG. 2, includes a relatively thin, generally flat sheet 34 of chemically inert plastic material similar to that from which the outer grid structure is injection molded. The said sheet is placed in the mold cavity defined by mold parts 50 and 52 together with shims 54, 54 to be described in greater detail with reference to FIG. 3.

Considering first the structural configuration of the panel 10, FIG. 4 illustrates the cross sectional make-up of the panel, and more particularly illustrates the configuration of the generally flat perforated plastic sheet or plate 34 with reference to the above described outer grid defining portion of the panel 10, and also with reference to the remaining inner portion of the panel, particularly the longitudinally extending breaker bars 36 defined adjacent the inner edges of the longitudinally extending ribs 26, 26 together with the perpendicularly oriented cross bars 38 associated with the cross ribs 28 and 30. From FIG. 4 it will be apparent that these various ribs 26, 28 and 30, together with their associated bars 36 and 38 defined in the inner portion of the panel 10, all have a common thickness $t$ which is on the order of the thickness for the generally flat plate 34. The plate 34 is of such thickness that it may be conveniently perforated as a result of an inexpensive punching process rather than by the necessity for drilling a plurality of holes in the plastic panel in the conventional manner characteristic of prior art panels. Such a drilling process has been thought necessary due to the thickness required for providing a sufficiently rugged sidewall construction for an electroplating barrel.

It should be noted that the flat plate 34 is characterized herein as being generally flat, but that a protuberance, indicated generally at 24b in FIG. 4, is provided for by the upper portion 50 of the mold. Thus, the initially flat plate must be bent slightly in this area upon closing of the mold in the injection molding machine. While this portion of the panel, indicated generally at 24c might be fabricated to preserve the initially flat configuration of the panel 34, and the protuberance 24b defined instead in the lower portion 52 of the mold part, presently preferred practice calls for bending of the sheet in this area as a preliminary step to introducing the molten plastic material into the mold cavities defined by the parts 50 and 52.

Prior to discussing the preferred method of fabricating the panel 10 it should be noted that the importance of the longitudinally extending breaker bars 36, 36 cannot be overemphasized. These bars serve to tumble the articles in the barrel as the barrel rotates during the electroplating process. Without the presence of such breaker bars the load of articles in the barrel will tend to slide across the surface of the perforated plate 34 rather than being tumbled as they drop downwardly in the rotating barrel. The protuberance 24b also serves as a breaker bar in the assembled barrel configuration best shown in FIG. 5. Thus, this protuberance 24b not only serves to provide a convenient thickened structure, from which the notch 24b can be formed, but also serves to provide an additional dam, or bar for breaking up the load of articles and causing them to move with respect to one another as they fall downwardly in the rotating barrel during the electroplating process.

Turning next to a more detailed configuration of the preferred method for fabricating an electroplating barrel panel 10 in accordance with the present invention, FIG. 3 shows an upper mold part 50 having a cavity defined therein which serves to provide definition to the generally rectanuglar outer panel portion of the panel 10 as depicted in FIG. 2 above reference line 32. A second mold part 52 is also shown in FIG. 3 and cooperates with the first mentioned mold part 50 so as to define at least a portion of the inner panel. The cavity in the latter mold part 52 is considerably more shallow than the cavity of the first mold part 50, defining only the breaker bars 36 and 38. However, it is noted that these bars 36 and 38 are oriented inwardly of the ribs 26, 28 and 30. Further, these breaker bars 36 and 38 are rounded so as to prevent snagging the articles loaded in the barrel.

In accordance with the present invention and as an important feature thereof means is provided for shimming the inner and outer mold parts 50 and 52 with respect to one another to accommodate the preformed sheet 34 such that the injection of the molten plastic material into the mold cavities defined by the mold parts 50 and 52 will result in a composite panel structure which can be said to be of integral construction. The initially flat perforated plastic sheet 34 is preferably fabricated from a polypropylene material which includes 10 percent by weight of chopped glass fiber material so as to improve its wear resistance. The plastic material injected into the mold cavity of the parts 50 and 52 is similarly constituted, and the resulting panel 10 comprises an integral structure with inner and outer portions defined for the specific purposes set forth above.

In order to form the notch 24 at one side of the panel 10 so as to receive the opposite side edge 22 of an adjacent panel a further machining step is required following the injection molding step mentioned above. A comparison of FIGS. 3 and 4 shows that a triangular cross sectional portion of material 24a must be machined away so as to form the generally rectangular notch 24 for receiving the generally trapezoidally shaped edge portion 22 of an adjacent panel. FIG. 5 shows six such panels arranged in a hexagonal pattern with the uppermost panel 10a received in the resulting barrel construction so as to provide a convenient cover which can be removed for inserting or removing the load of articles in the barrel. Conventional spring clips 14 are provided to retain the cover 10a in its receptacle, and the resulting electroplating barrel, as constructed in accordance with the present invention, provides a convenient inexpensive barrel construction which lends itself to mass production techniques as a result of its unique configuration. The chopped glass fiber material entrained in the molten plastic, and in the perforated plastic sheet 34 provides a degree of wear resistance not possible with prior art electroplating barrel constructions.

I claim:

1. An electroplating barrel comprising a plurality of rectangular panels, and end plates for supporting the panels so that said panels define a generally polygon shaped sidewall for the barrel, each of said panels including:
   a. an outer grid portion having longitudinally extending ribs and intersecting cross ribs defining relatively large size rectangular openings therebetween, all of said ribs having a thickness ($t$) and being molded from a chemically inert plastic material,
   b. an inner portion of said panel having a generally flat sheet of said chemically inert material which sheet is integrally attached to the inside edges of said ribs in said outer grid portion, said sheet having at least approximately the same thickness ($t$) as that of said ribs, and
   c. said inner panel portion further including longitudinally extending load breaker bars formed from said chemically inert plastic material and integrally attached to the inside surface of said sheet, said breaker bars having a height approximately equal to said thickness ($t$) and said bars being so arranged as to form an inwardly projecting extension of each of said longitudinally extending ribs in said outer grid portion.

2. The electroplating barrel according to claim 1 wherein said chemically inert plastic material comprises mostly polypropylene and includes substantial proportion (over 10% by weight) of chopped glass fibers.

3. The electroplating barrel according to claim 1 wherein each of said panel outer portions defining said large rectangular openings further includes longitudinally extending side portions significantly thicker than said ribs, the inside surfaces of said side portions being generally coextensive with the inside edges of said ribs and said inside surfaces integrally attached to said generally flat sheet, the free longitudinally extending side edges of adjacent panel side portion defining cooperating surfaces interlocked with one another to provide a barrel sidewall of polygon shape.

4. The electroplating barrel according to claim 1 wherein said flat sheet of thickness ($t$) is perforated having a perforation pattern such that the perforations are spaced from one another by a distance at least approximately equal to that of said sheet thickness ($t$).

* * * * *

UNITED STATES PATENT OFFICE
CERTIFICATE OF CORRECTION

Patent No. 4,018,427          Dated April 19, 1977

Inventor(s) Alfred N. Marulli

It is certified that error appears in the above-identified patent and that said Letters Patent are hereby corrected as shown below:

Col. 1, line 8, "sidewll" should be --sidewall--.

Col. 2, line 1, "use" should be --used--.

Col. 4, line 54, after "10a" insert --loosely--.

Signed and Sealed this

Twenty-first Day of June 1977

[SEAL]

Attest:

RUTH C. MASON
*Attesting Officer*

C. MARSHALL DANN
*Commissioner of Patents and Trademarks*